United States Patent [19]

Uhlenhop et al.

[11] Patent Number: 5,745,863
[45] Date of Patent: Apr. 28, 1998

[54] THREE DIMENSIONAL LATERAL DISPLACEMENT DISPLAY SYMBOLOGY WHICH IS CONFORMAL TO THE EARTH

[75] Inventors: Dale A. Uhlenhop; Dean Richard Wilkens, both of Glendale, Ariz.

[73] Assignee: Honeywell Inc., Minneapolis, Minn.

[21] Appl. No.: 532,187

[22] Filed: Sep. 22, 1995

[51] Int. Cl.$^6$ .................................................. G01C 23/00
[52] U.S. Cl. .................. 701/14; 701/1; 701/16; 701/18; 701/207
[58] Field of Search ........................ 364/428, 449.1, 364/427, 429, 430, 423.098

[56] References Cited

U.S. PATENT DOCUMENTS

| | | | |
|---|---|---|---|
| 3,521,227 | 7/1970 | Congleton et al. | 340/27 |
| 3,573,827 | 4/1971 | DeBotton et al. | 343/108 |
| 3,643,213 | 2/1972 | Yurasek et al. | 340/27 NA |
| 3,648,231 | 3/1972 | Owens, Jr. et al. | 340/27 NA |
| 3,784,969 | 1/1974 | Wilckens et al. | 340/27 NA |
| 3,789,356 | 1/1974 | Harenberg, Jr. et al. | 340/27 NA |
| 3,999,007 | 12/1976 | Crane | 358/104 |
| 4,104,612 | 8/1978 | Lowe | 340/27 AT |
| 4,297,691 | 10/1981 | Kodama et al. | 340/723 |
| 4,326,189 | 4/1982 | Crane | 340/27 NA |
| 4,368,517 | 1/1983 | Lovering | 364/428 |
| 4,413,323 | 11/1983 | Müller | 364/521 |
| 4,454,496 | 6/1984 | Lowe | 340/980 |
| 4,554,545 | 11/1985 | Lowe | 340/980 |
| 4,999,780 | 3/1991 | Mitchell | 364/428 |
| 5,016,177 | 5/1991 | Lambregts | 364/424.06 |
| 5,047,942 | 9/1991 | Middleton et al. | 364/427 |
| 5,289,185 | 2/1994 | Ramier et al. | 340/971 |
| 5,343,395 | 8/1994 | Watts | 364/428 |
| 5,369,589 | 11/1994 | Steiner | 364/449 |
| 5,593,114 | 1/1997 | Ruhl | 244/183 |

FOREIGN PATENT DOCUMENTS

| | | |
|---|---|---|
| 1126839 | 6/1982 | Canada. |
| 2389535 | 12/1978 | France. |
| 1598640 | 9/1981 | United Kingdom. |

OTHER PUBLICATIONS

Richard S. Bray, "A NASA-Ames Head-Up Display", NASA Ames Research Center, Jan. 10, 1994.

*Primary Examiner*—Kevin J. Teska
*Assistant Examiner*—Russell W. Frejd
*Attorney, Agent, or Firm*—Brian C. Downs; Ronald E. Champion

[57] ABSTRACT

An aircraft display communicates three dimensional lateral information to a pilot of the aircraft. An extended course centerline symbol and lateral deviation marks indicate lateral deviation from a desired course along with approximate altitude and distance-to-go information to the pilot. The course centerline extends toward a vanishing point near the horizon line of the display. The centerline symbol swings laterally across the display responsive to changes in lateral deviation of the aircraft such that an intuitive perspective view is provided to the pilot. Lateral deviation marks provide precise lateral deviation information to the pilot. The display is adaptable to all phases of flight, but is particularly useful during the approach phase of flight. The preferred embodiment is on a head-up display for instrument flight conditions.

10 Claims, 9 Drawing Sheets

THREE DIMENSIONAL LATERAL DISPLACEMENT DISPLAY SYMBOLOGY WHICH IS CONFORMAL TO THE EARTH

BACKGROUND OF INVENTION

The present invention relates generally to electronic displays and more specifically to electronic display symbology in an aircraft cockpit.

During instrument flight conditions (i.e. poor visibility) pilots must rely on instruments to navigate an aircraft to a destination, particularly during approach and land on a runway. Current systems use instrument landing systems (ILS), microwave landing systems(MLS) or satellite landing systems(SLS) to guide aircraft during approach to a runway. These systems typically use a deviation bar on a horizontal situation indicator(HSI) to indicated lateral deviation from the approach course and a glide slope indicator on the HSI to indicate vertical deviation from the glide slope.

The deviation bar and glide slope indicator communicate flight path deviation to the pilot however, this system is deficient in several respects. First, this system is not intuitive. A pilot must be trained to read, interpret and comprehend the deviation bar and glide slope indicator. Further, the pilot must mentally compensate for the increased sensitivity of the instruments as the aircraft proceeds along the approach path. The pilot must continually "scan" the deviation bar and glide slope indicator which distracts the pilot from other tasks. Finally, current systems distract the pilot from the important task of looking out the window to check the situational progress of the flight.

Secondary considerations concerning deficiencies in the prior art include pilot fatigue caused by continually "scanning" multiple instruments. This is especially critical during the approach phase of flight when a pilot is under an increased workload and pilot error is critical. Pilot fatigue increases the chance of pilot error and possible serious accidents.

Various solutions to these problems have been proposed in the prior art however, each prior solution either retained one of the old problems or introduced new problems.

One improvement in this area is the head-up display. Head-up displays enable the pilot to simultaneously view navigation symbology, such as traditional localizer and glide slope symbology, while viewing outside the aircraft. However, since head-up displays retained essentially the same localizer and glide slope symbology, they are not "intuitive".

Other approaches to this problem include various symbology intended to provide an intuitive guidance display. These systems, often referred to as "highways in the sky", have inadequate in that require excessive processing power and can be interpreted ambiguously. No one has yet solved the problems associated with providing an intuitive three dimensional lateral navigation display.

Aircraft navigation would be simplified, pilot error and fatigue would be reduced and safety would be increased by a display which improves the communication of flight information to the pilot.

Clearly there exists the need for an aircraft display which simplifies cockpit information, reduces the need to scan displays, reduces pilot fatigue, and increases aircraft safety.

SUMMARY OF THE INVENTION

The invention discloses an aircraft display which communicates three dimensional lateral information to a pilot of the aircraft. An extended course centerline symbol and lateral deviation marks indicate lateral deviation from a desired course along with approximate altitude and distance-to-go information to the pilot. The course centerline extends toward a vanishing point near the horizon line of the display. The centerline symbol swings laterally across the display responsive to changes in lateral deviation of the aircraft such that an intuitive perspective view is provided to the pilot. Lateral deviation marks provide precise lateral deviation information to the pilot. The display is adaptable to all phases of flight, but is particularly useful during the approach phase of flight. The preferred embodiment is on a head-up display for instrument flight conditions.

The key to the invention is the unique display of the extended course centerline symbology. Using the available navigation data, the invention computes and then displays a course centerline which extends toward a vanishing point near the horizon line of the display. The centerline symbol is intended to simulate the appearance of a course centerline which is drawn on the earth's surface, hence the term "conformal to the earth". The centerline can also be displayed in a perspective view thereby further simulating a conformal centerline.

The intuitive simplicity of the invention is apparent when one considers how easy it would be to follow a course centerline if it were actually drawn on the earth.

During the approach phase of flight the invention simulates a conformal centerline all along the approach path. At high altitudes large lateral movement of the aircraft is required to move the position of the centerline, while at low altitudes much smaller lateral movement of the aircraft is required to make an equivalent move of the centerline.

The invention is also useful during other phases of flight such as cruise. At high altitudes or in mountainous terrain it is not appropriate to display the symbols as conformal to the actual earth surface, therefore a virtual earth surface is simulated. During approach this is simulated as a flat surface at the same altitude as the destination runway. During cruise this is simulated as a flat surface 2000 feet below the cruise altitude.

Another element of the invention are the lateral deviation marks. These marks provide a scale for determining the lateral deviation from the course or centerline. The preferred embodiment uses two deviation marks located on each side of the aircraft symbol. During an ILS approach these marks represent one and two degrees of lateral deviation from the course centerline.

The deviation marks also convey intuitive altitude information. At high altitudes the deviation marks are displayed close together. As altitude decreases, the deviation marks spread apart, just as if they were actually drawn on the earth.

Therefore, objects of the invention are to provide an intuitive display to communicate three dimensional situational data to a pilot, simplify aircraft navigation, reduce pilot workload and increase aircraft safety.

A feature of the invention is a moving extended course centerline which is conformal to a virtual earth surface.

Another feature of the invention are lateral deviation marks.

' An advantage of the invention is the ability to communicate lateral course deviation information to a pilot in an intuitive manner.

Another advantage of the invention is the ability to communicate approximate altitude and distance to a selected end point.

The significant features of the invention are illustrated in the figures and described more fully below.

DETAILED DESCRIPTION

Figure 1:
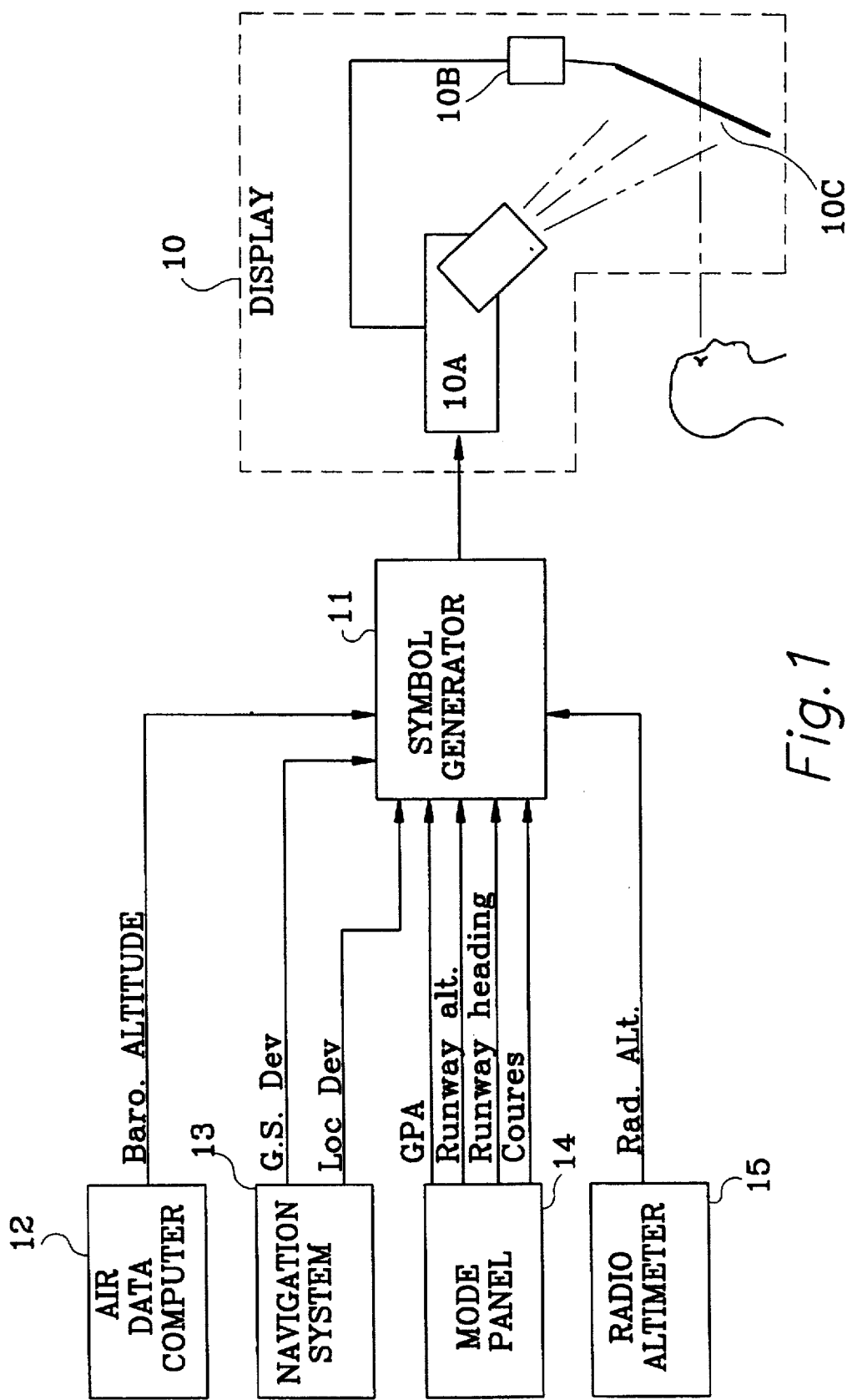
FIG. 1 is a block diagram of the invention and various aircraft systems.

FIG. 1 is a block diagram of the invention and various aircraft systems. Shown in FIG. 1 are display 10, symbol generator 11, air data computer 12, navigation system 13, mode panel 14 and radio altimeter 15.

In the preferred embodiment display 10 is a head-up display as shown. Elements of display 10 include overhead unit 10A, brightness control 10B and combiner 10C(also generically referred to as display screen 10C). The invention however, is not limited to head-up displays. The invention is adaptable to essentially any display including, but not limited to helmet mounted displays, CRTs displays, LCD displays and plasma displays.

All of the above listed components are known in the art and will be discussed only briefly here. The invention consists of a new way to use these known components in a new way to provide a new navigation display.

Symbol generator 11 generates the symbology commands which control what is displayed by display 10. In order to generate the symbology commands, symbol generator 11 communicates with various aircraft systems 12–15 to obtain the necessary data. Air data computer 12 provides barometric altitude. Navigation system 13 provides glide slope deviation and localizer deviation. Mode panel 14 provides glide path angle(GPA), runway altitude, runway heading and course. Radio altimeter 15 provides radio altitude.

It is understood that many alternate embodiments are envisioned by the invention. Particularly it is envisioned that equivalent data may be obtained from other aircraft systems including, but not limited to satellite landing systems, GPS, microwave landing systems, inertial reference systems, flight management systems and the like.

Figure 2:
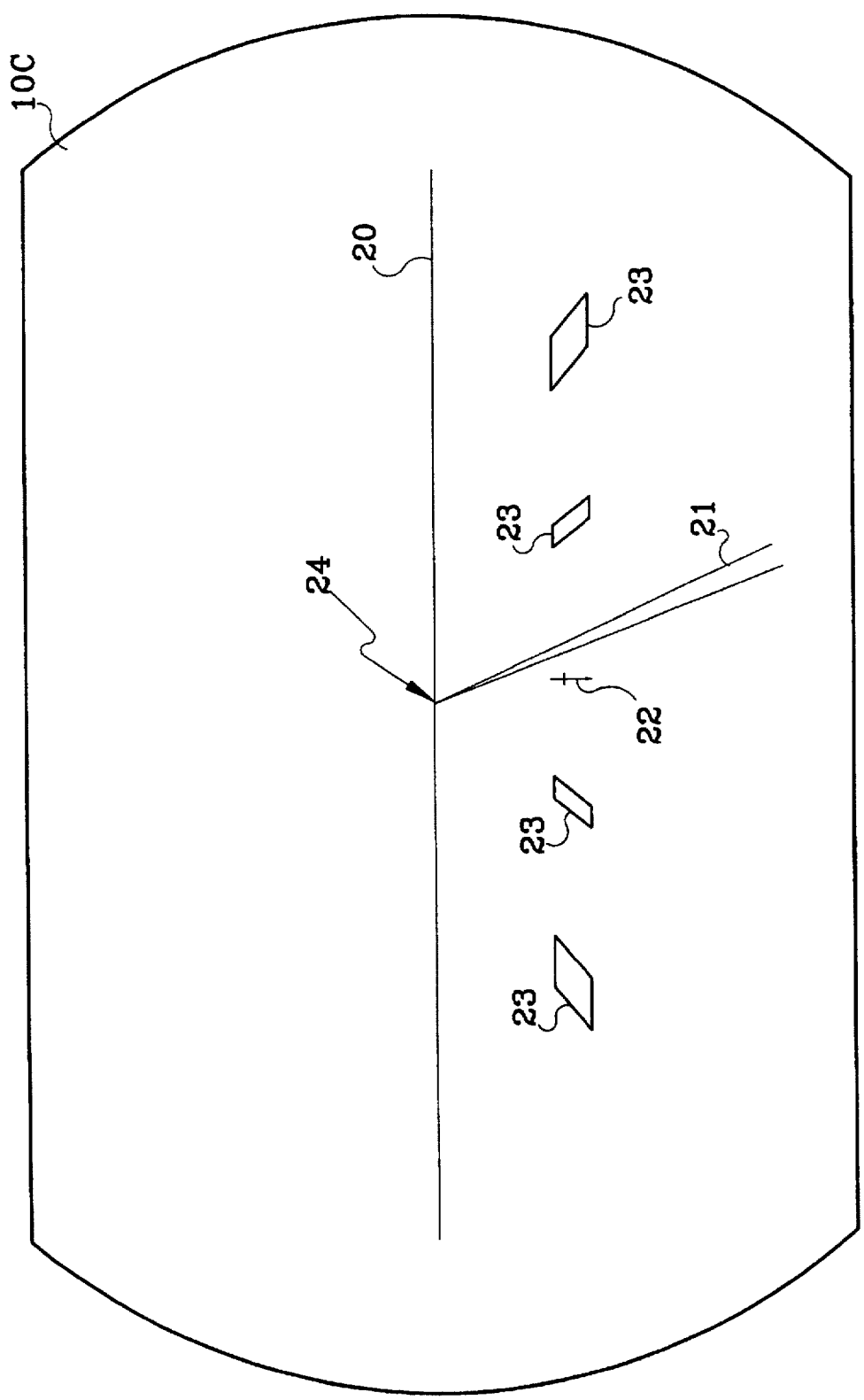
FIG. 2 illustrates the invention in level flight.

FIG. 2 illustrates the invention in level flight as embodied on a head-up display. Shown are horizon line 20, centerline 21, aircraft symbol 22 and lateral deviation marks 23.

Horizon line 20 is indicative of the earth horizon and is known in the art. Centerline 21 extends toward vanishing point 24 which is at or near horizon line 20. Vanishing point 24 is indicative of the selected course of the aircraft. Centerline 21 is shown embodied as a perspective view where centerline 21 narrows as it extends toward vanishing point 24. Centerline 21 is drawn on the right side of aircraft symbol 22 thereby communicating that the aircraft is left of the desired course. As discussed above, centerline 21 is representative of a course centerline drawn on the earth and therefore is an intuitive navigation display.

Aircraft symbol 22 is a standard aircraft reference symbol. Symbol 22 remains in essentially a fixed position on display screen 10C as is standard in the art. Aircraft symbol 22 does, however, rotate during banking maneuvers.

Lateral deviation marks 23 are located a predetermined distance from aircraft symbol 22. Deviation marks provide a reference scale for indicating either an angular or distance deviation from centerline 21. In the preferred embodiment of an ILS approach, deviation marks 23 represent one degree and two degrees of deviation from either side of the localizer signal. During cruise the deviation marks represent 1000 feet and 2000 feet of lateral displacement from the course.

Deviation marks 23 are shown in the preferred perspective view. In this embodiment deviation marks 23 are depicted as portions of deviation lines extending toward vanishing point 24. To reduce clutter only the portions of the deviation lines adjacent the aircraft symbol 22 are displayed. During the approach phase of flight deviation marks are scaled to be representative of marks drawn on the earth. For example, at high altitudes the deviation marks 23 appear shorter and closer to aircraft symbol 22. As altitude decreases the deviation marks appear to lengthen and spread out from the aircraft symbol 22.

Figure 3:
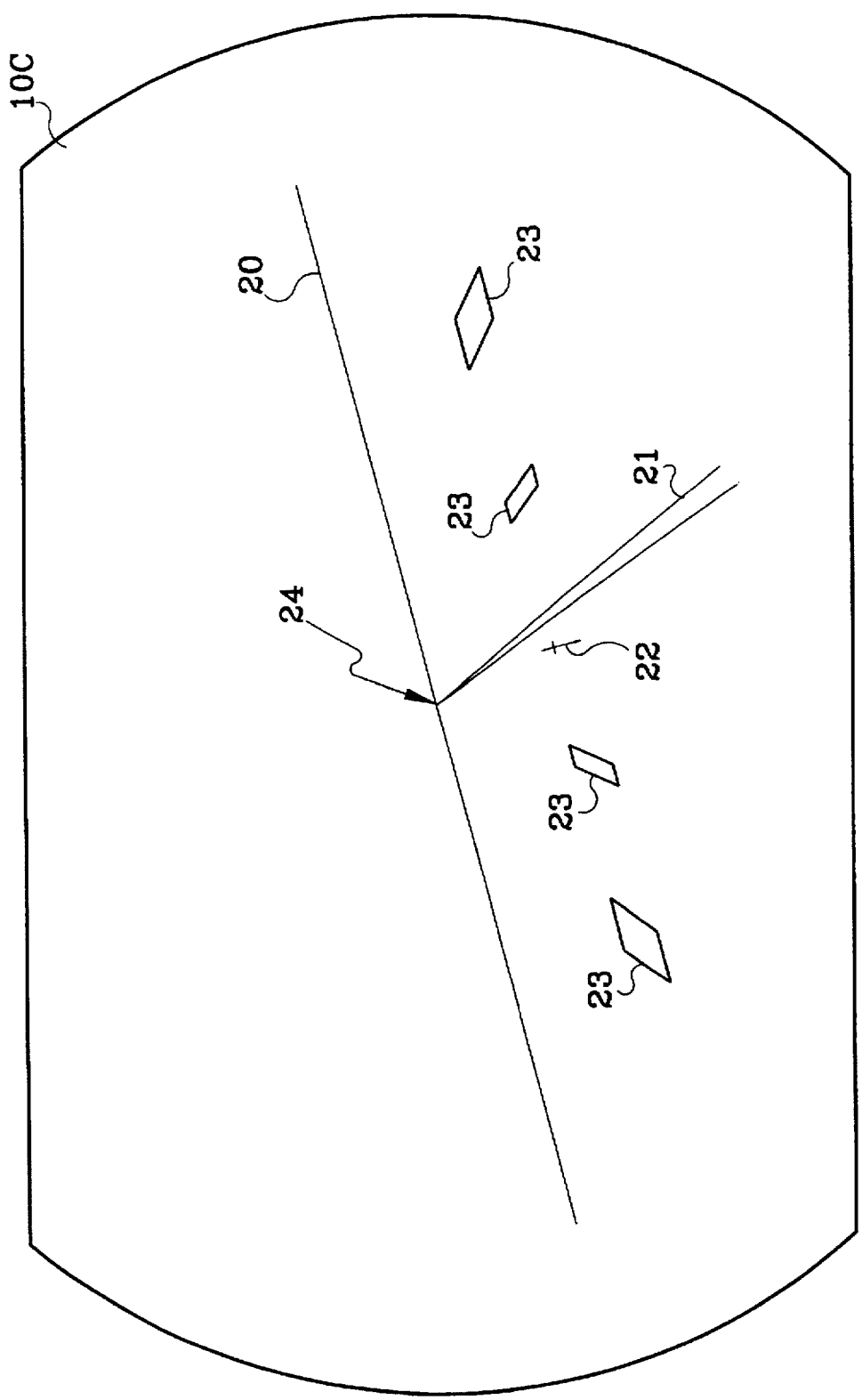
FIG. 3 illustrates the invention during a left banking turn.

FIG. 3 illustrates the invention during a right banking turn maneuver. During a banking maneuver horizon line 20 tilts thereby simulating the view of the horizon during a banking maneuver. Centerline 21, aircraft symbol 22 and deviation marks 23 are each referenced to horizon line 20 and therefore tilt along with horizon line 20.

Figure 4:
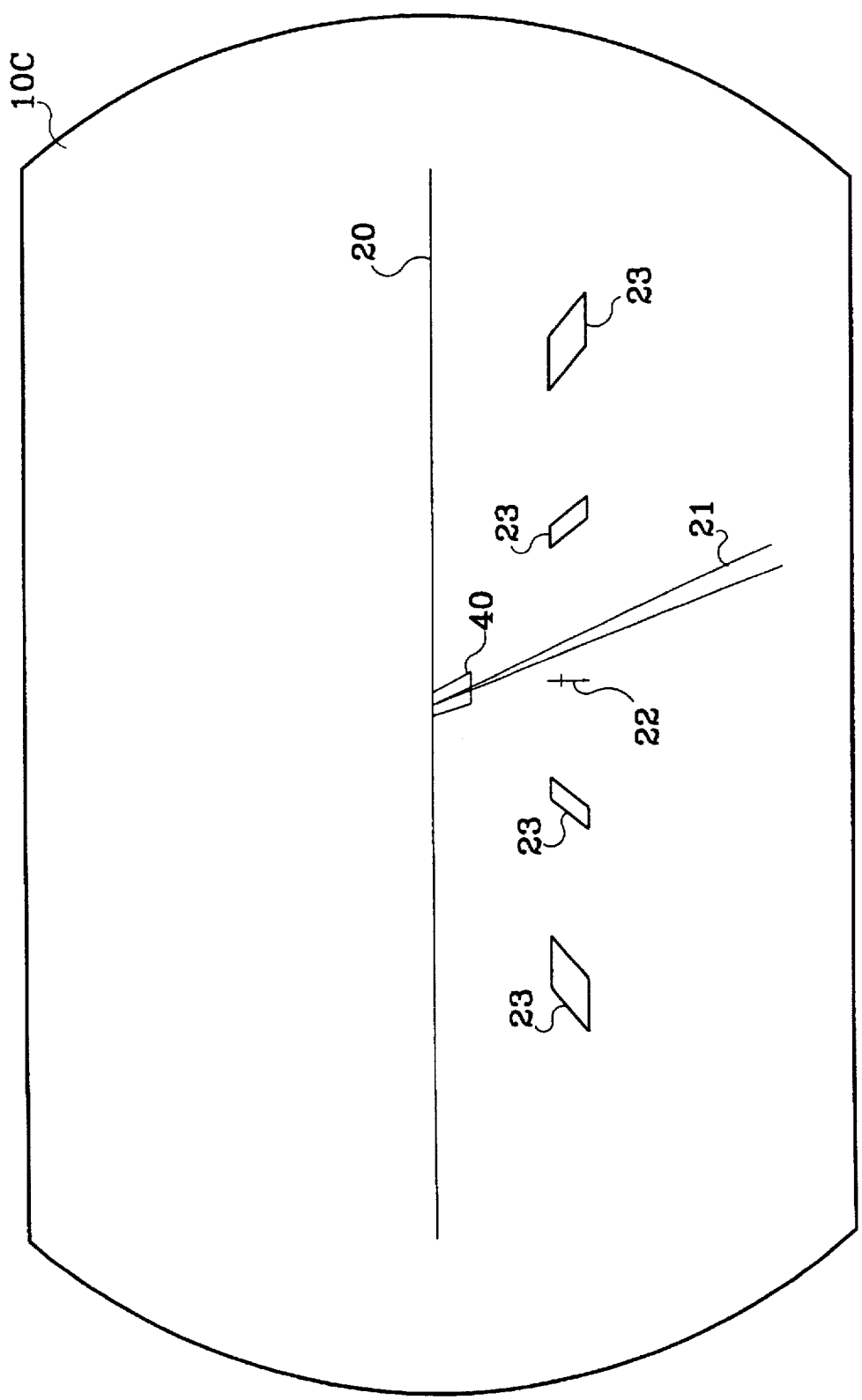
FIG. 4 illustrates the invention approaching a runway.

FIG. 4 illustrates the invention approaching a runway 40. Aircraft symbol 22 remains left of centerline 21 thereby providing an intuitive indication that the aircraft is left of the desired approach path. Runway symbol 40 extends toward vanishing point 24 in the same manner as centerline 21 and deviation marks 23. Runway symbol 40 differs from centerline 21 and deviation marks 23 in that the size and position of runway 40 is indicative of the location of the actual runway.

It is instructive to point out that perspective depiction of runway symbol 40 is known in the art. Discussion of how to draw and implement such a symbol can be found in the prior art. One reference which discusses these techniques is an article by Richard S. Bray, Associate, NASA Ames Research Center, entitled "A NASA-AMES HEAD-UP DISPLAY, dated Jan. 10, 1994.

It is apparent to those skilled in the art that the invention's centerline 21 and deviation marks 23 symbols are implemented using the same techniques that are used in the prior art to implement perspective runway symbols such as runway 40. Modifications are made to the prior art techniques to compensate for length, width and vertical and lateral displacement of the centerline 21 and deviation marks 23. An example of such computations is provided in FIGS. 6A through 6B discussed below.

Figure 5:
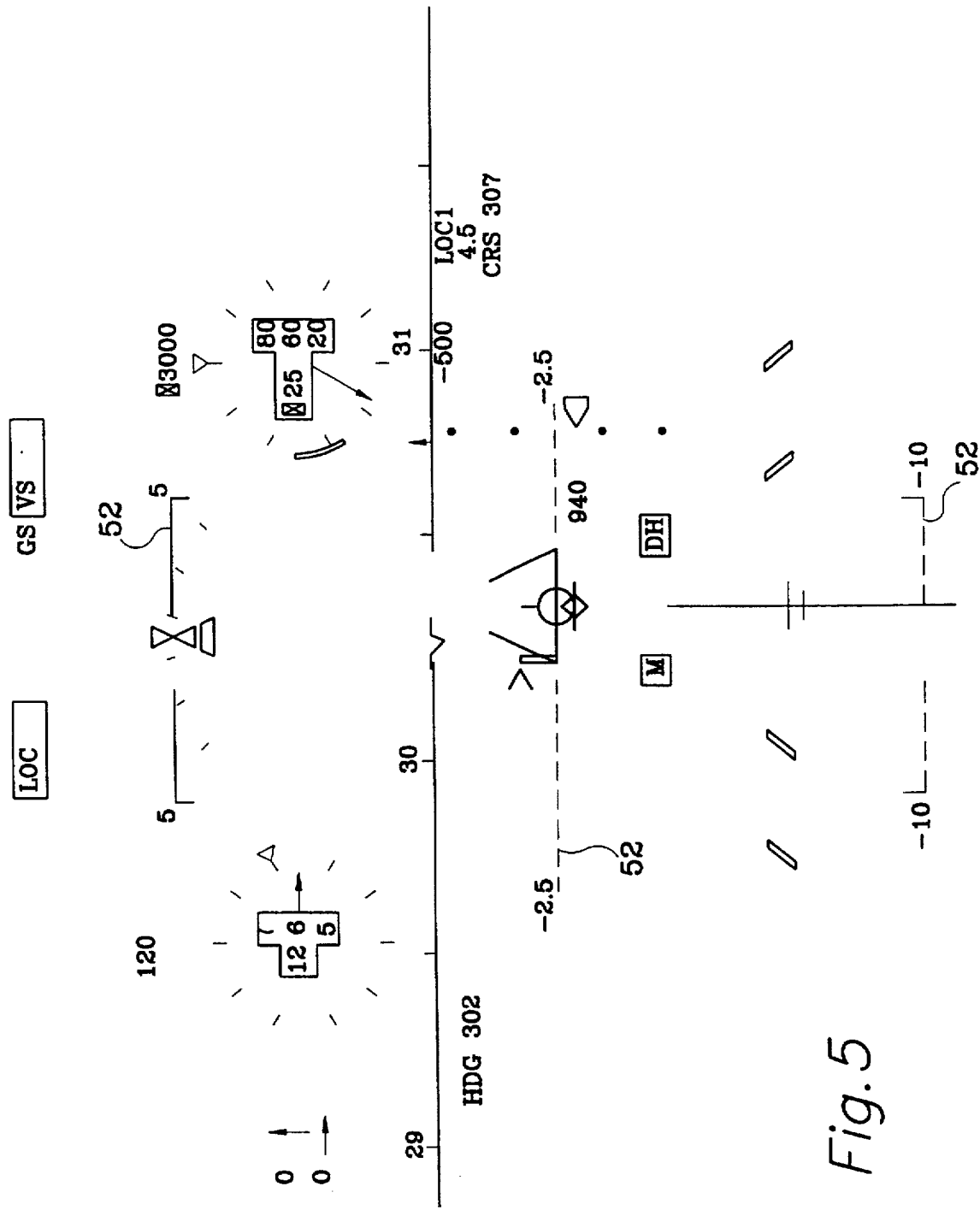
FIG. 5 illustrates the invention embodied in a head-up display approaching a runway.

FIG. 5 illustrates the invention embodied in a head-up display approaching a runway. In this figure the aircraft is exactly on the approach path as indicated by aircraft symbol 22 located exactly on centerline 21. The aircraft is 940 feet above runway altitude as indicated by radio altimeter 50. The aircraft is also slightly above the glide slope as indicated by glide slope indicator 51. Also in this figure is pitch scale 52.

FIGS. 6A through 6D illustrate the preferred embodiment for computing and implementing the invention. Those skilled in the art can readily adapt these calculations or use substantially similar calculations for other embodiments including embodiments using satellite landing systems such as the global positioning system(GPS) and the like.

Figure 6A:
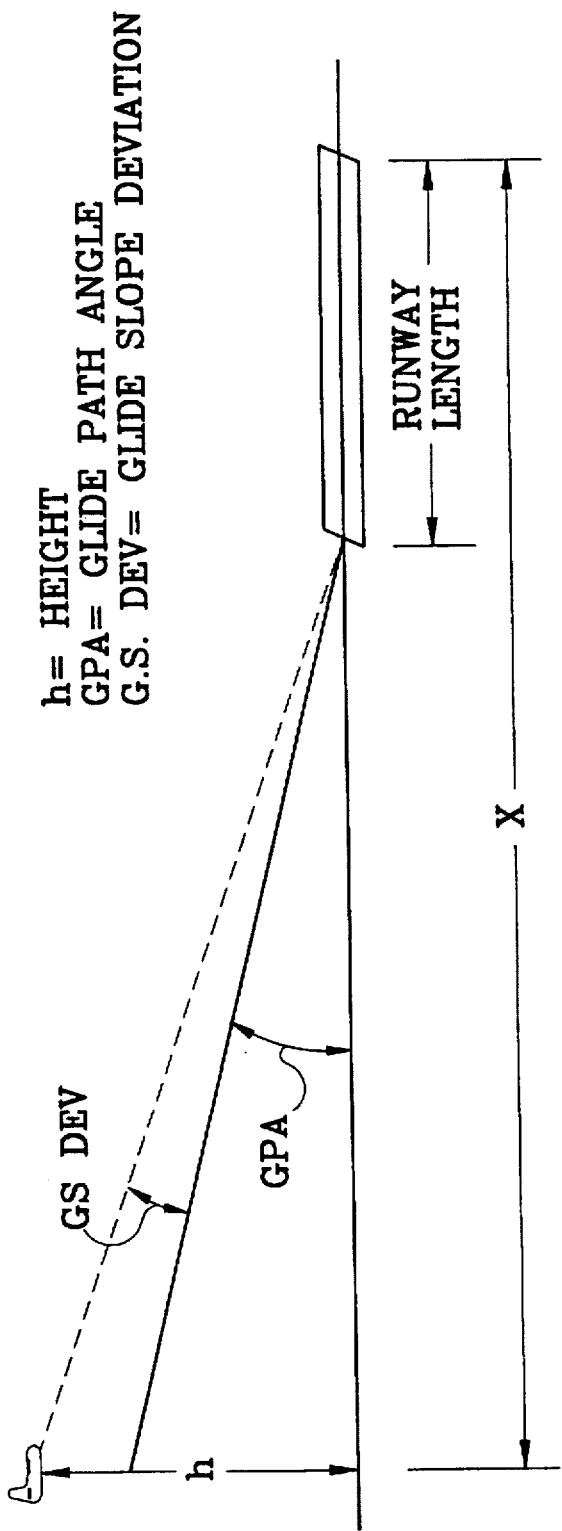
FIG. 6A illustrates the distance to localizer calculations used in the preferred embodiment.

FIG. 6A illustrates the distance to localizer calculations used in the preferred embodiment. This calculation is straight forward using basic trigonometry as shown in the figure. The glide path angle(GPA) for the particular runway approach is either entered by the pilot or retrieved from a database. Runway length is also either entered by the pilot or retrieved from a data base. Glide slope deviation(GS Dev) is available from the ILS receiver. Adding(or subtracting) the glide slope deviation yields the actual approach path angle of the aircraft. Altitude(h) is available from other aircraft systems such as the air data computer or radio altitude. In the preferred embodiment, barometric altitude is used when the aircraft is more than 500 feet above the runway. A blend of barometric altitude and radio altitude is used from 500 feet to 100 feet. Finally, radio altitude is used below 100 feet.

Figure 6B:
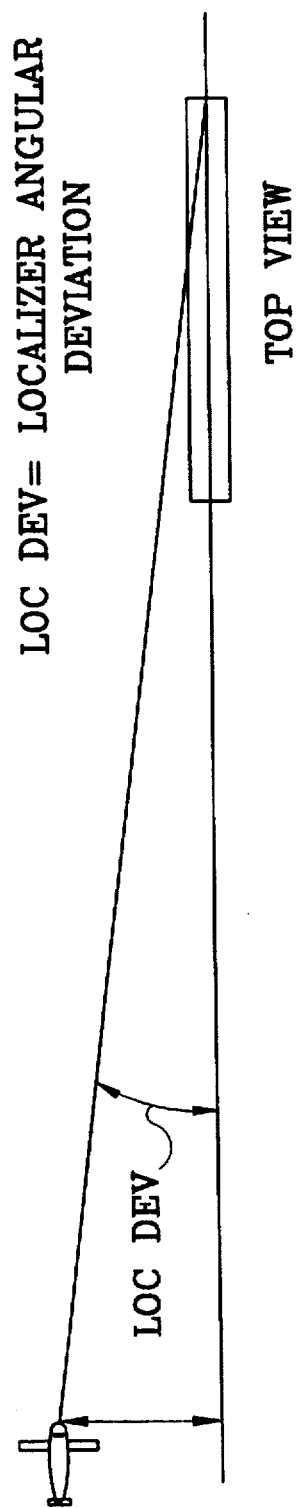
FIG. 6B illustrates the lateral displacement distance calculations used in the preferred embodiment.

FIG. 6B illustrates the lateral displacement distance calculations used in the preferred embodiment. Localizer deviation(LOC Dev) is available from the ILS receiver. The lateral displacement(y) is easily computed as:

$$y = \tan(LOC\ Dev) * X$$

Figure 6C:
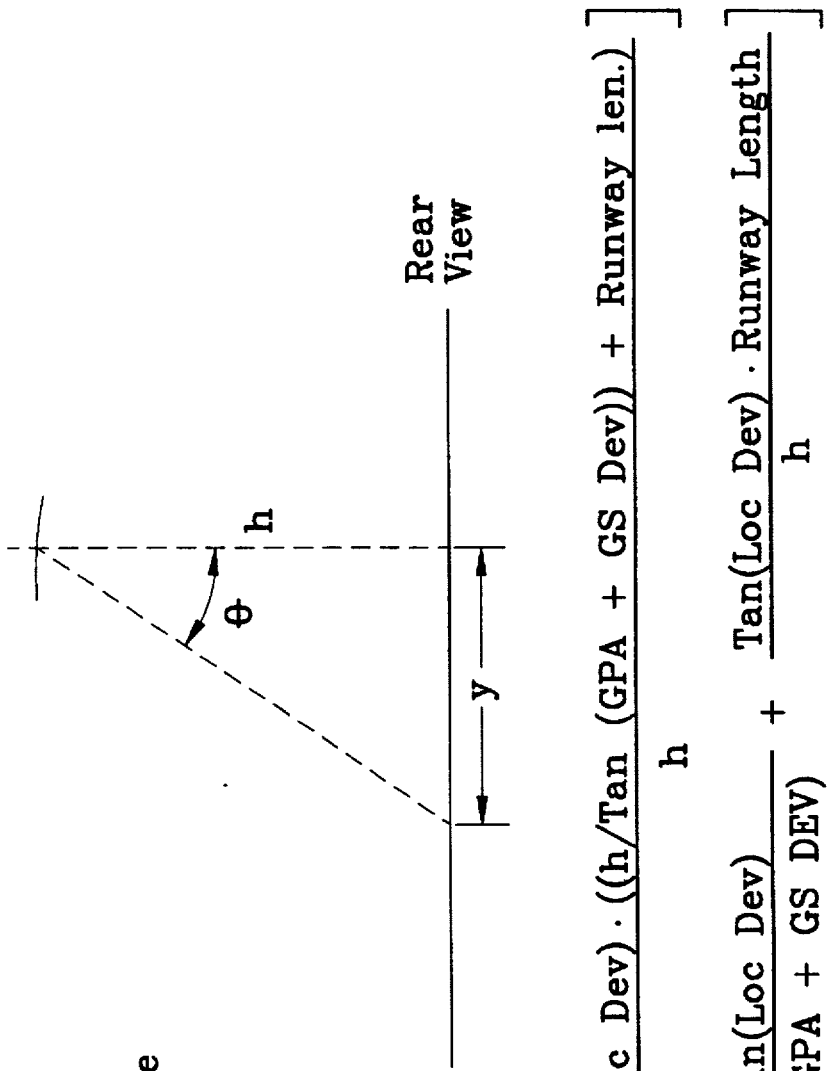
FIG. 6C illustrates the inverse slope calculations used in the preferred embodiment.

FIG. 6C illustrates the inverse slope calculations used in the preferred embodiment. Calculation of inverse slope(θ) is straight forward as shown in the figure using the results of the previous computations.

Figure 6D:
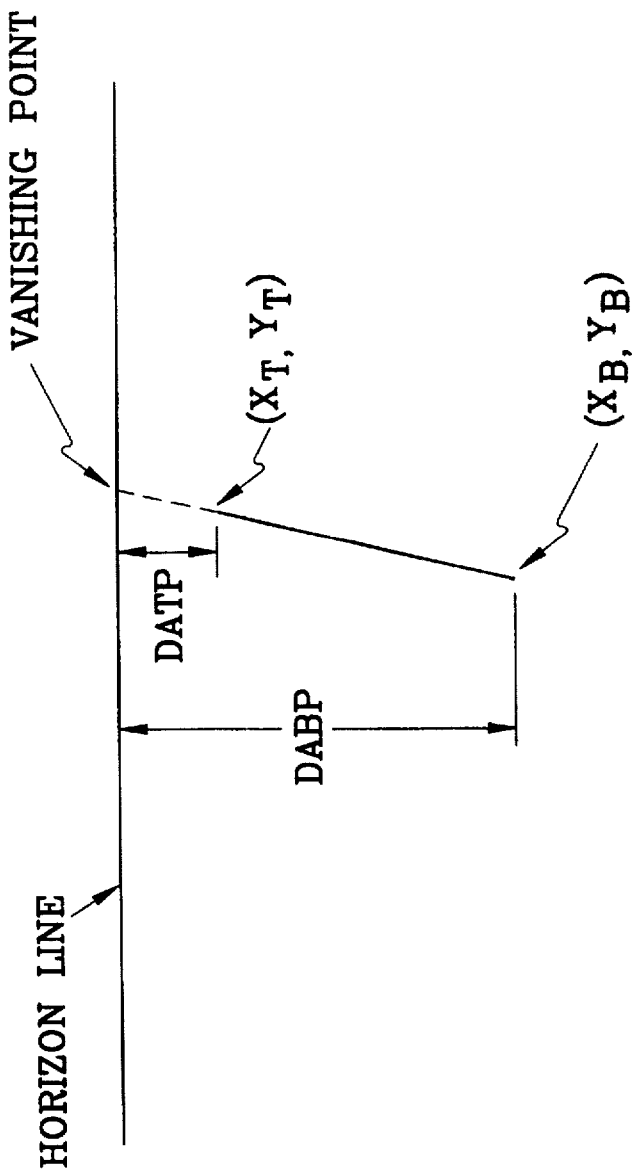
FIG. 6D illustrates the centerline and deviation mark coordinate calculations used in the preferred embodiment.

FIG. 6D illustrates the centerline and deviation mark coordinate calculations used in the preferred embodiment. As discussed above, these are similar to the calculations used in the prior art to implement a perspective view of runway.

Given the coordinates of the vanishing point and the inverse slope(computed above), the coordinates of the centerline are easily computed using the equations shown in the figure.

The depression angle top point(DATP) and depression angle bottom point(DABP) are predetermined values and specify how far below the horizon line the symbol is positioned. In the preferred embodiment(illustrated in FIG. 5) the depression angles for the symbols are as follows:

| SYMBOL | DATP | DABP |
|---|---|---|
| Runway | 1 deg. | GPA |
| centerline | GPA + 1 deg. | 11 degs. |
| deviation marks | GPA + 3.5 deg. | GPA + 4 degs. |

The coordinates for the lateral deviation marks are computed in a similar manner except that lateral displacement is computed relative to the aircraft's position. In the preferred embodiment the marks are positioned at one and two degrees of localizer deviation on each side of the aircraft.

Variable width(i.e. perspective view) centerlines and deviation marks are achieved by adding(and subtracting) a correction factor to the inverse slope prior to calculating the x,y coordinates. In the preferred embodiment, however, computations for the width of the deviation marks is simplified by computing coordinates for a single line for each deviation mark and merely adding(and subtracting) a fixed correction factor to each coordinate to yield coordinates for the marks. This also has the desirable effect of fixed width deviation marks.

The method of implementing the invention follows from the description above. First, navigational or positional signals are received. Typically these are ILS, MLS, GPS, VOR signals or the like. The navigational signals are interpreted yielding aircraft position signals or data indicative of aircraft position relative to a desired course. Using the aircraft position signals to compute a centerline signal representative of a desired course centerline which is conformal to the earth(or virtual earth) surface and displaying a centerline symbol representative of the computed centerline signal on a display device.

The method is enhanced by the addition of steps to display lateral deviation marks. This requires the steps of using the aircraft position signals to compute deviation mark signals representative of altitude dependent lateral deviation marks and displaying deviation mark symbols representative of the deviation mark signals on the display device.

The method is yet further enhanced by steps to include perspective views of the centerline and deviation mark symbols as discussed in the above specification.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention. Alternate embodiments envisioned include, but are not limited to, using new electronic display devices which may be developed in the future and using the invention with various aircraft systems and navigation systems including GPS.

It is clear from the foregoing that the present invention represents a new and useful display symbology and apparatus for displaying information on electronic displays and the like.

The embodiments of an invention in which an exclusive property or right is claimed are define as follows:

1. A navigation display system for aircraft comprising:
   a) navigation means for generating vertical position data and lateral position data indicative of the position of said aircraft; and,
   b) symbol generating means, in communication with said navigation means, for generating symbology signals from said vertical and lateral position data, said symbology signals representative of an extended course centerline; and,
   c) electronic display means, in communication with said symbol generating means, for displaying said symbology signals to an operator, said electronic display means including,
      1) a display screen on which symbols representative of said symbology signals are displayed.

2. The navigation display system according to claim 1 wherein said symbol generating means includes means for generating symbology signals representative of at least one lateral deviation mark.

3. The navigation display system according to claim 2 wherein said symbol generating means includes means for generating symbology signals representative of perspective views of said extended course centerline and said at least one lateral deviation mark.

4. The navigation display system according to claim 1 wherein said navigation means includes localizer receiving means for generating said lateral position data.

5. A display system for aircraft having a navigation system for providing vertical and lateral position data, said display system comprising:

a) a symbol generator in communication with said navigation system, said symbol generator using said vertical and lateral position data to generate symbology signals representative of an extended course centerline; and, b) an electronic display having a display screen portion, said electronic display in communication with said symbol generator and capable of displaying symbols representative of said symbology signals on said display screen portion.

6. The display system for aircraft according to claim 5 wherein said symbol generator uses said vertical and lateral position data to generate symbology signals representative of at least one lateral deviation mark.

7. The display system for aircraft according to claim 6 wherein said extended centerline and said at least one lateral deviation marks extend toward a vanishing point.

8. The display system for aircraft according to claim 5 wherein said extended centerline is conformal to a virtual earth surface.

9. A method of displaying three dimensional course symbology on an aircraft display comprising the steps of:

a) receiving external navigation signals;

b) interpreting said navigation signals into aircraft position signals;

c) generating a course centerline signal from said aircraft position signals, said course centerline signal representative of a course centerline which is conformal to a virtual earth; and, d) displaying a centerline symbol on said aircraft display, said symbol representative of said course center line signal.

10. The method of displaying three dimensional lateral displacement symbology according to claim 9 wherein said interpreting step is followed by the steps of:

a) generating at least one lateral deviation mark signal from said aircraft position signals, and, b) displaying at least one lateral deviation symbol on said aircraft display, said deviation mark symbol representative of said indicator signal.

* * * * *